United States Patent
Kristinsson et al.

(10) Patent No.: US 10,562,495 B2
(45) Date of Patent: Feb. 18, 2020

(54) VEHICLE ALERT FROM A NON-PAIRED DEVICE

(71) Applicant: Ford Global Technologies, LLC, Dearborn, MI (US)

(72) Inventors: Johannes Geir Kristinsson, Ann Arbor, MI (US); David Anthony Hatton, Berkley, MI (US); Hussein F. Nasrallah, Dearborn Heights, MI (US); Thomas Nelson, Plymouth, MI (US); Krishnaswamy Venkatesh Prasad, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/083,166

(22) PCT Filed: Mar. 9, 2016

(86) PCT No.: PCT/US2016/021477
§ 371 (c)(1),
(2) Date: Sep. 7, 2018

(87) PCT Pub. No.: WO2017/155525
PCT Pub. Date: Sep. 14, 2017

(65) Prior Publication Data
US 2019/0092283 A1    Mar. 28, 2019

(51) Int. Cl.
*B60R 25/24*    (2013.01)
*H04L 29/06*    (2006.01)
(Continued)

(52) U.S. Cl.
CPC ............ *B60R 25/243* (2013.01); *B60Q 1/482* (2013.01); *B60R 25/102* (2013.01);
(Continued)

(58) Field of Classification Search
CPC ... B60R 25/243; B60R 25/102; B60R 25/246; B60R 25/30; H04L 63/0861;
(Continued)

(56) References Cited

U.S. PATENT DOCUMENTS 3,668,526 A    6/1972 Raskin
5,623,245 A    4/1997 Gilmore
(Continued)

FOREIGN PATENT DOCUMENTS

CN    103415014 A    11/2013
KR    101335344 B1    12/2013
(Continued)

OTHER PUBLICATIONS

International Search Report for PCT/US2016/021477, dated May 31, 2016, 2 pages.
(Continued)

*Primary Examiner* — Hirdepal Singh
(74) *Attorney, Agent, or Firm* — Brooks Kushman PC; Brandon Hicks

(57) ABSTRACT

A vehicle includes a horn, a plurality of exterior lights, and at least one controller. The at least one controller is configured to grant vehicle system access to a nomadic device paired to the vehicle, and in response to receiving a message that contains data identifying a source of the message while the vehicle is in a key-off state from a nomadic device not paired to the vehicle, activate the horn and exterior lights according to respective patterns.

17 Claims, 2 Drawing Sheets

(51) Int. Cl.
*H04W 12/06* (2009.01)
*B60Q 1/48* (2006.01)
*B60R 25/102* (2013.01)
*H04W 12/00* (2009.01)
*B60R 25/30* (2013.01)

(52) U.S. Cl.
CPC ........ *B60R 25/246* (2013.01); *H04L 63/0861* (2013.01); *H04W 12/06* (2013.01); *B60Q 2900/30* (2013.01); *B60R 25/30* (2013.01); *H04W 12/00508* (2019.01)

(58) Field of Classification Search
CPC ... B60Q 1/482; B60Q 1/52; H04W 12/00508; H04W 12/06
USPC .................................................... 340/426.36
See application file for complete search history.

(56) References Cited

U.S. PATENT DOCUMENTS

| | | | |
|---|---|---|---|
| 5,808,564 | A | 9/1998 | Simms et al. |
| 6,753,763 | B2 | 6/2004 | Flick |
| 7,541,921 | B2 | 6/2009 | Wittorf et al. |
| 8,280,583 | B2 | 10/2012 | Staehlin et al. |
| 8,768,292 | B2 | 7/2014 | Welch |
| 9,013,300 | B2 | 4/2015 | Felix |
| 9,031,735 | B2* | 5/2015 | Pauli ........................ F02D 41/22 701/29.6 |
| 9,142,109 | B2 | 9/2015 | Fish et al. |
| 2002/0084893 | A1 | 7/2002 | Eisenman |
| 2006/0049925 | A1 | 3/2006 | Hara et al. |
| 2006/0125620 | A1 | 6/2006 | Smith et al. |
| 2006/0132294 | A1 | 6/2006 | Spark |
| 2010/0075655 | A1 | 3/2010 | Howarter et al. |
| 2011/0060480 | A1* | 3/2011 | Mottla .................... G06Q 10/02 701/2 |
| 2014/0240111 | A1* | 8/2014 | Kleve .................... G08B 25/016 340/426.18 |
| 2016/0086391 | A1* | 3/2016 | Ricci ...................... G07C 5/008 701/29.3 |
| 2016/0214571 | A1* | 7/2016 | Othmer ................. B60R 25/209 |
| 2017/0048680 | A1* | 2/2017 | Chuang ................. H04W 76/10 |

FOREIGN PATENT DOCUMENTS

| | | |
|---|---|---|
| WO | 9855346 A1 | 12/1998 |
| WO | 2008091621 A1 | 7/2008 |

OTHER PUBLICATIONS

Stanley Goodner, "Viper SmartStart 4.0 puts vehicle control on your wrist," published by Gizmag, Sep. 17, 2015, 6 pages.

Miles Johnson, "Hyundai Blue Link SmartWatch App Available for Download on GooglePlay," published by Hyundai Motor America, Fountain Valley California, Mar. 4, 2015, 4 pages.

* cited by examiner

VEHICLE ALERT FROM A NON-PAIRED DEVICE

TECHNICAL FIELD

This application is generally related to activation of a vehicle alert system in response to reception of a message from a non-paired nomadic device containing source identifying information.

BACKGROUND

Some vehicles are configured to connect wirelessly to a remote mobile device including a paired vehicle key fob and a paired mobile phone. The majority of vehicle key fobs include an alarm button which allows the holder of the key fob to activate an alarm in a vehicle paired with the key fob. The alarm includes a horn of the vehicle and exterior lights of the vehicle. Typically, the vehicle chirps the horn and flashes the exterior directional lights when the alarm button is pressed. The alarm allows the holder of the key fob to raise awareness of the location of the vehicle. The alarm is often used to assist a motorist in locating a lost vehicle in a parking structure or raise awareness of nearby people of a potential need for assistance. However, this requires the user to be carrying his/her key fob in an easy to access location and to be in close vicinity of his or her own vehicle.

SUMMARY

A vehicle includes a horn, a plurality of exterior lights, and at least one controller. The at least one controller may be configured to grant vehicle system access to a nomadic device paired to the vehicle, and in response to receiving a message that contains data identifying a source of the message while the vehicle is in a key-off state from a nomadic device not paired to the vehicle, activate the horn and exterior lights according to respective patterns.

A method for a vehicle includes receiving by a transceiver a message from a remote wireless device not paired to the vehicle, and activating, by a controller configured to grant vehicle system access to a remote wireless device paired to the vehicle, a vehicle horn or vehicle exterior lights in response to the message containing data identifying a source of the message.

A system of a vehicle includes at least one controller configured to grant vehicle system access to a paired nomadic device, and in response to receiving a message containing data identifying a source of the message from a non-paired nomadic device while the vehicle is in a key-off state, activate a horn of the vehicle or lights of the vehicle.

DETAILED DESCRIPTION

Figure 1:
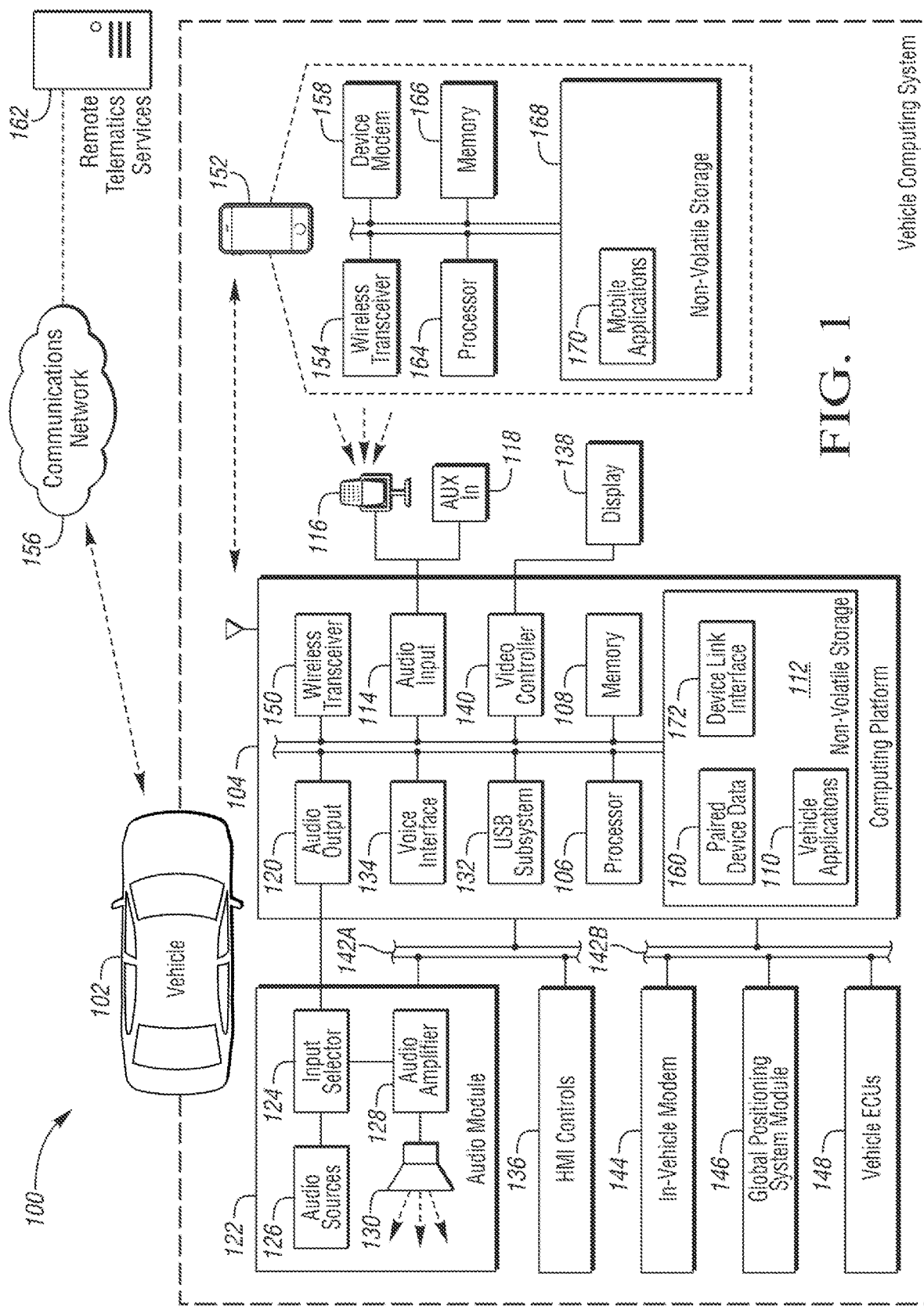
FIG. 1 is an exemplary block topology of a vehicle infotainment system.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The embodiments of the present disclosure generally provide for a plurality of circuits or other electrical devices. All references to the circuits and other electrical devices and the functionality provided by each, are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programmed to perform any number of the functions as disclosed.

This disclosure, among other things, proposes vehicular systems and methods for activating a vehicle subsystem configured to provide a vehicle alert such as a vehicle horn, a vehicle theft siren, or vehicle lights. Here, activation of an alarm of a vehicle not associated with or paired to a wireless device is enabled such that an individual may activate alarms of multiple vehicles. First, the individual enters their personal information onto the wireless device. The use of personal information is to deter misuse, by recording personal information a device or individual involved in system misuse may be identified. The personal information includes a phone number, MAC address, name, date of birth, driver license, vehicle identification number (VIN) of a vehicle owned by the individual, social security number, and federal ID number. The individual agrees to share the personal information if the need for assistance occurs. The individual activates the wireless device to transmit a request for an alarm along with the personal information to nearby vehicles. If the wireless device is configured to determine a current location, the wireless device may also transmit the current location. A vehicle receives the alarm request along with the personal information and after the vehicle authenticates the personal information, the vehicle may activate the horn, siren, or flash exterior lights of the vehicle. The vehicle may re-transmit the alarm request based on a step-down counter. The vehicle may also limit activation to within a predetermined distance from the vehicle, for example, a vehicle may only activate the alarm if a location associated with the request is within 100 feet. The location associated with the request may be based on GPS data, signal strength, or signal triangulation. Many vehicles are configured to receive a wireless signal from a key fob at a distance of greater than 200 meters. Therefore, activation of all vehicles within the range of the wireless device may be too distracting.

The alarm of a limited number of multiple vehicles proximate with the location of the wireless device may draw the attention of individuals in the area to the location of the wireless device even when the device is not near a paired vehicle. The wireless device may be a nomadic device such as a wearable electronic device, a smart watch, a cell phone, a key fob, a tablet, an electronic ring/necklace, electronic eye glasses, a portable device, or other wearable electronic device. Along with the alarm request, the remote device or wearable device may include current medical data such as a heart rate, skin temperature, glucose level, eye characteristics, or respiration rate.

The vehicle may be configured to grant, to a paired wireless device, access to systems of the vehicle. The vehicle systems may include vehicular sub-systems and distributed functionality occurring in the vehicle. The vehicle systems and sub-systems may communicate with other vehicular modules via a wire-line or wireless communication protocol. The communication protocol may include but is not limited to wire connections such as CAN, LIN, FlexRay, and Ethernet, and wireless connections such as high frequency communication connections (greater than one gigahertz) such as WiFi, and Bluetooth or lower high frequency communication connections (less than one gigahertz) such as remote keyless entry (RKE), tire pressure monitoring systems (TPMS). The vehicular sub-system may communicate either directly or indirectly with a paired wireless device. The wireless device may be a wearable device that may be affixed to a person such that the person is not required to hold the device. Examples of wearable device may include but is not limited to a wrist band, a smart watch, a necklace, a chest band, a smart ring, or eye glasses. Also, an article of clothing equipped with electronics is a wearable device, such as a shirt or vest. The wireless device may include a wire-line or wireless communication port such as WiFi and Bluetooth, may include motion sensors such as accelerometers, gyroscopes, pulse sensors, respiration sensors, glucose sensors, temperature sensors, optical sensors, and may include other circuitry including circuitry capable of determining a location. The location determination may be a geographical location such as from a global positioning system (GPS) unit, or a relative location such as one triangulated within the passenger compartment of a vehicle.

FIG. 1 illustrates an example diagram of a system 100 that may be used to provide telematics services to a vehicle 102. The vehicle 102 may be one of various types of passenger vehicles, such as a crossover utility vehicle (CUV), a sport utility vehicle (SUV), a truck, a recreational vehicle (RV), a boat, a plane or other mobile machine for transporting people or goods. Telematics services may include, as some non-limiting possibilities, navigation, turn-by-turn directions, vehicle health reports, local business search, accident reporting, and hands-free calling. In an example, the system 100 may include the SYNC system manufactured by The Ford Motor Company of Dearborn, Mich. It should be noted that the illustrated system 100 is merely an example, and more, fewer, and/or differently located elements may be used.

The computing platform 104 may include one or more processors 106 configured to perform instructions, commands and other routines in support of the processes described herein. For instance, the computing platform 104 may be configured to execute instructions of vehicle applications 110 to provide features such as navigation, accident reporting, satellite radio decoding, and hands-free calling. Such instructions and other data may be maintained in a non-volatile manner using a variety of types of computer-readable storage medium 112. The computer-readable medium 112 (also referred to as a processor-readable medium or storage) includes any non-transitory medium (e.g., a tangible medium) that participates in providing instructions or other data that may be read by the processor 106 of the computing platform 104. The processor may also be multiple processors in multiple computing units which each perform a part of the overall driver alert. For example, one processor may perform audible alert functions, located in the audio module (122), while a different processor in the video controller (140) handles the visual alert, predicated from the same alert message. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

The computing platform 104 may be provided with various features allowing the vehicle occupants to interface with the computing platform 104. For example, the computing platform 104 may include an audio input 114 configured to receive spoken commands from vehicle occupants through a connected microphone 116, and auxiliary audio input 118 configured to receive audio signals from connected devices. The auxiliary audio input 118 may be a physical connection, such as an electrical wire or a fiber optic cable, or a wireless input, such as a BLUETOOTH audio connection. In some examples, the audio input 114 may be configured to provide audio processing capabilities, such as pre-amplification of low-level signals, and conversion of analog inputs into digital data for processing by the processor 106.

The computing platform 104 may also provide one or more audio outputs 120 to an input of an audio module 122 having audio playback functionality. In other examples, the computing platform 104 may provide the audio output to an occupant through use of one or more dedicated speakers (not illustrated). The audio module 122 may include an input selector 124 configured to provide audio content from a selected audio source 126 to an audio amplifier 128 for playback through vehicle speakers 130 or headphones (not illustrated). The audio sources 126 may include, as some examples, decoded amplitude modulated (AM) or frequency modulated (FM) radio signals, and audio signals from compact disc (CD) or digital versatile disk (DVD) audio playback. The audio sources 126 may also include audio received from the computing platform 104, such as audio content generated by the computing platform 104, audio content decoded from flash memory drives connected to a universal serial bus (USB) subsystem 132 of the computing platform 104, and audio content passed through the computing platform 104 from the auxiliary audio input 118.

The computing platform 104 may utilize a voice interface 134 to provide a hands-free interface to the computing platform 104. The voice interface 134 may support speech recognition from audio received via the microphone 116 according to grammar associated with available commands, and voice prompt generation for output via the audio module 122. In some cases, the system may be configured to temporarily mute or otherwise override the audio source specified by the input selector 124 when an audio prompt is ready for presentation by the computing platform 104 and another audio source 126 is selected for playback.

The computing platform 104 may also receive input from human-machine interface (HMI) controls 136 configured to provide for occupant interaction with the vehicle 102. For instance, the computing platform 104 may interface with one or more buttons or other HMI controls configured to invoke functions on the computing platform 104 (e.g., steering wheel audio buttons, a push-to-talk button, instrument panel controls, etc.). The computing platform 104 may also drive or otherwise communicate with one or more displays 138 configured to provide visual output to vehicle occupants by way of a video controller 140. In some cases, the display 138 may be a touch screen further configured to receive user touch input via the video controller 140, while in other cases the display 138 may be a display only, without touch input capabilities.

The computing platform 104 may be further configured to communicate with other components of the vehicle 102 via one or more in-vehicle networks 142. The in-vehicle networks 142 may include one or more of a vehicle controller area network (CAN), an Ethernet network, and a media oriented system transfer (MOST), as some examples. The in-vehicle networks 142 may allow the computing platform 104 to communicate with other vehicle 102 systems, such as a vehicle modem 144 (which may not be present in some configurations), a global positioning system (GPS) module 146 configured to provide current vehicle 102 location and heading information, and various vehicle ECUs 148 configured to cooperate with the computing platform 104. As some non-limiting possibilities, the vehicle ECUs 148 may include a powertrain control module configured to provide control of engine operating components (e.g., idle control components, fuel delivery components, emissions control components, etc.) and monitoring of engine operating components (e.g., status of engine diagnostic codes); a body control module configured to manage various power control functions such as exterior lighting, interior lighting, keyless entry, remote start, and point of access status verification (e.g., closure status of the hood, doors and/or trunk of the vehicle 102); a radio transceiver module configured to communicate with key fobs or other local vehicle 102 devices; and a climate control management module configured to provide control and monitoring of heating and cooling system components (e.g., compressor clutch and blower fan control, temperature sensor information, etc.).

As shown, the audio module 122 and the HMI controls 136 may communicate with the computing platform 104 over a first in-vehicle network 142A, and the vehicle modem 144, GPS module 146, and vehicle ECUs 148 may communicate with the computing platform 104 over a second in-vehicle network 142B. In other examples, the computing platform 104 may be connected to more or fewer in-vehicle networks 142. Additionally or alternatively, one or more HMI controls 136 or other components may be connected to the computing platform 104 via different in-vehicle networks 142 than shown, or directly without connection to an in-vehicle network 142.

The computing platform 104 may also be configured to communicate with mobile devices 152 of the vehicle occupants. The mobile devices 152 may be any of various types of portable computing device, such as cellular phones, tablet computers, smart watches, laptop computers, portable music players, key fob, or other devices capable of communication with the computing platform 104. In many examples, the computing platform 104 may include a wireless transceiver 150 (e.g., a BLUETOOTH module, a ZIGBEE transceiver, a Wi-Fi transceiver, an IrDA transceiver, an RFID transceiver, etc.) configured to communicate with a compatible wireless transceiver 154 of the mobile device 152. The wireless modules may transmit data at a carrier frequency or a center frequency. The center frequency is an important aspect of a wireless system by impacting noise immunity and bandwidth. For example, typical remote keyless entry systems operate at 315 MHz in the United States, and 433 MHz in Europe, while WiFi and Bluetooth may operate at frequencies including frequencies over 2 GHz such as 2.4 GHz. Additionally or alternately, the computing platform 104 may communicate with the mobile device 152 over a wired connection, such as via a USB connection between the mobile device 152 and the USB subsystem 132.

In an alternative embodiment, a vehicle ECU 148 may include a dedicated keyless entry system (KES) separate from the infotainment system that may be used to receive signals from the mobile devices 150. Also, a vehicle ECU 148 may include dedicated wireless module configured to communicate with wearables outside the vehicle such as a Wi-Fi module or Bluetooth module (e.g., for a mobile device executing an applications such as a mobile-phone-keyfob).

The communications network 156 may provide communications services, such as packet-switched network services (e.g., Internet access, VoIP communication services), to devices connected to the communications network 156. An example of a communications network 156 may include a cellular telephone network. Mobile devices 152 may provide network connectivity to the communications network 156 via a device modem 158 of the mobile device 152. To facilitate the communications over the communications network 156, mobile devices 152 may be associated with unique device identifiers (e.g., mobile device numbers (MDNs), Internet protocol (IP) addresses, etc.) to identify the communications of the mobile devices 152 over the communications network 156. In some cases, occupants of the vehicle 102 or devices having permission to connect to the computing platform 104 may be identified by the computing platform 104 according to paired device data 160 maintained in the storage medium 112. The paired device data 160 may indicate, for example, the unique device identifiers of mobile devices 152 previously paired with the computing platform 104 of the vehicle 102, such that the computing platform 104 may automatically reconnect to the mobile devices 152 referenced in the paired device data 160 without user intervention.

When a mobile device 152 that supports network connectivity is paired with the computing platform 104, the mobile device 152 may allow the computing platform 104 to use the network connectivity of the device modem 158 to communicate over the communications network 156 with the remote telematics services 162. In one example, the computing platform 104 may utilize a data-over-voice plan or data plan of the mobile device 152 to communicate information between the computing platform 104 and the communications network 156. Additionally or alternatively, the computing platform 104 may utilize the vehicle modem 144 to communicate information between the computing platform 104 and the communications network 156, without use of the communications facilities of the mobile device 152.

Similar to the computing platform 104, the mobile device 152 may include one or more processors 164 configured to execute instructions of mobile applications 170 loaded to a memory 166 of the mobile device 152 from storage medium 168 of the mobile device 152. In some examples, the mobile applications 170 may be configured to communicate with the computing platform 104 via the wireless transceiver 154 and with the remote telematics services 162 or other network services via the device modem 158. The computing platform 104 may also include a device link interface 172 to facilitate the integration of functionality of the mobile applications 170 into the grammar of commands available via the voice interface 134. The device link interface 172 may also provide the mobile applications 170 with access to vehicle information available to the computing platform 104 via the in-vehicle networks 142. An example of a device link interface 172 may be the SYNC APPLINK component of the SYNC system provided by The Ford Motor Company of Dearborn, Mich.

Figure 2:
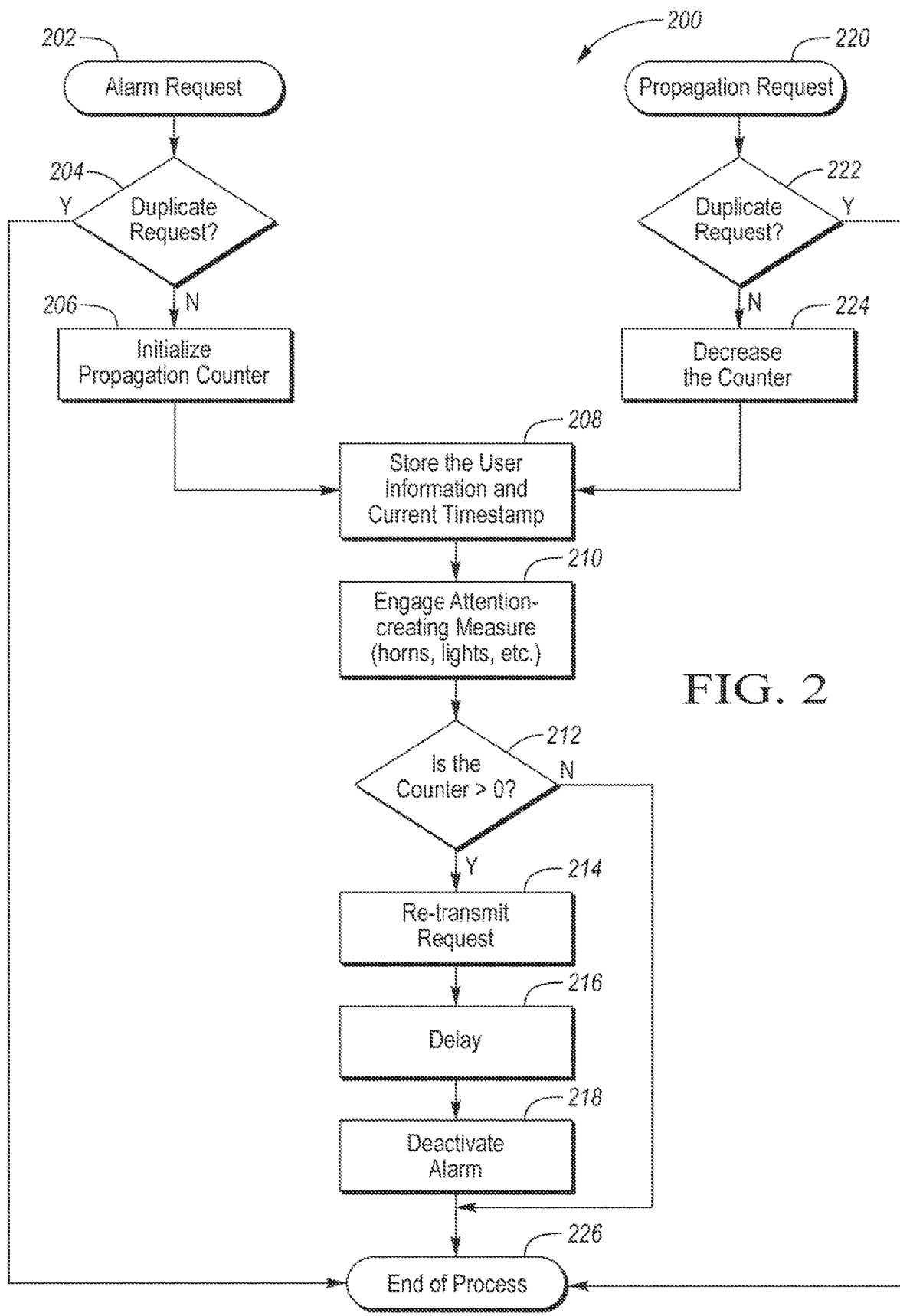
FIG. 2 is a flow diagram of a vehicle alert system activating exterior lights and a horn based on a distress call from a non-paired device.

FIG. 2 is a flow diagram 200 of a vehicle alert system activating exterior lights and a horn based on a distress call from a non-paired device. Typically, only a wireless device that is paired with a vehicle is granted access to systems in the vehicle, and wireless devices that are not paired with the vehicle do not have access to systems in the vehicle. Typically wireless devices are paired with a vehicle based on control of both the vehicle and the wireless device. For example, to pair a wireless device with a vehicle using Bluetooth, requires access to the vehicle interior and use of a currently paired key to put the vehicle into an "accessory" mode. Then, accessing an infotainment system to open up a "settings" window, from the setting window the system is put in a discovery mode. In the discovery mode, available Bluetooth devices in range of the vehicle are displayed. A selection of one of the available device may then prompt for a personal identification number (PIN) of the wireless device; after that PIN is entered the wireless device is paired with the vehicle.

Pairing a key fob typically requires more steps, for example, it may require one or two currently paired key fobs to be present. For example a pairing of a new key fob may require a $1^{st}$ paired key fob inserted into the ignition lock and turned to the "run" position, next press and hold the "unlock" button on your new unpaired key fob for five seconds, then hold the "panic" button for one second (while still holding the "unlock" button), and release both buttons simultaneously. Then, listen for a chime to signal that the new unpaired key fob is in programming mode. Next press and release the "lock" and "unlock" button on a 2nd paired key fob, and simultaneously press and release the "unlock" button on the $2^{nd}$ paired key fob and the new unpaired key fob. Listen for the vehicle to produce a chime to confirm that the new unpaired key fob has been programmed and is now a paired key fob. Turn the ignition to the "off" position to exit programming mode. Furthermore, in some vehicles, reprogramming may require special equipment from a dealer or may require replacing in-vehicle hardware.

A paired key fob or wireless device may have access to many vehicle systems including an infotainment system, an embedded cellular modem, a GPS module, a powertrain control module, a body control module, a power lift gate module, a sliding door module, a door lock module, and a vehicle alert system. Typically, an unpaired wireless device does not have access to any vehicle systems. Here, a vehicle is configured to grant limited access to vehicle systems. The limited access is based on the authentication of the identity of the unpaired wireless device to limit possible abuse.

In step 202, the vehicle or a controller in the vehicle receives an alarm request from an unpaired wireless device. An alarm request that includes personal information is an authenticated message. The authenticated message may also include a certificate thus becoming a certified authenticated message. The certificate may be issued by a $3^{rd}$ party agency such as a state department of motor vehicles (DMV), a state social security administration (SSA), a vehicle manufacturer (e.g., Ford Motor Company), or other association. The personal information may contain multiple version (e.g., Name, social security number, and vehicle VIN number, such that the information may be able to be cross-checked. The alarm request may also include information regarding the source of the alarm request. For example, the personal information may include a phone number, a mobile identification number (MIN), mobile subscription identification number (MSIN), an electronic serial number (ESN), a media access control (MAC) address, a device owner's name, a device owner's date of birth, a device owner's driver license, vehicle identification number (VIN) of a vehicle owned by the device owner, a device owner's social security number, a device owner's federal ID number, or any other suitable identification system.

The authentication may include receiving a message on a specific carrier frequency, for example via an RKE system at 315 MHz or 433 MHz. Decoding the message and comparing the message or a subset of the message with a specific code associated with a general alarm activation. Comparing other fields of the message with valid personal information formats to validate the personal information. For example, the user of the unpaired wireless device may be required to have previously provided personal information to a common trusted entity, such as an automotive manufacturer, a governmental entity or a trust worthy organization such as VeriSign or RSA. After which their provided personal information may be verified and a personal certificate that attests to the authenticity of the provided personal information may be generated. Once the personal certificate is transferred to the vehicle with the personal information, the certificate allows the vehicle to verify and trust the personal information. The personal information may also be verified with a remote server, however, an alternative embodiment may just store the personal identification data and personal certificate without verification.

Along with the personal identifying information, the message may include data including a heartbeat rate, respiration rate, glucose level, body temperature, or other associated data relevant to indicate a medical emergency. The detection of a pulse, respirations or other physiological and biometric characteristics may allow the electronic wireless device to assess a medical emergency. The individual wearing the electronic device may be alerted by the device of the medical emergency in time to summon assistance including activating nearby vehicle alarms. In an alternative embodiment, the wearable device may be equipped with a wireless transceiver that may not be able to communicate over a cellular network. Here the wireless device may automatically transmit the message to a vehicle so that the vehicle may summon assistance via an embedded modem.

For example, in the event of a heart attack, the average EMS response time is around 9 minutes and the time for a person to transition from clinical death to biological death is around 3 minutes after cessation of respirations and a heartbeat. During this time, it may be advantageous to notify nearby individuals who may be able to assist. Here, the alarm would notify nearby individuals. Likewise, this is useful in the event of an attack in which the activation of multiple vehicle alarms may deter the attacker from continuing.

In step 204, the vehicle or a controller in the vehicle checks the message with a list of previous messages along with a time associated with the message and previous messages. If the time between reception of the message and previous messages is less than a predetermined amount, the message may be flagged as a duplicate message and the system will then branch to end the process at step 226. If the message does not match any previous messages, the flow proceeds to step 206.

In step 206, the vehicle or a controller in the vehicle initializes a counter to limit propagation of the alarm message. In step 208, the vehicle or a controller in the vehicle stores the personal information and a current time stamp associated with the alarm message. In step 210, the vehicle or a controller in the vehicle limits access of the controller based on the message to only allow activating an attention creating measure including flashing exterior lights or activating a horn of the vehicle. The exterior lights may be flashed according to a pattern such as alternating the illumination of left lights and right lights, flashing the headlamps, flashing the headlamps in a wig-wag fashion similar to an emergency pattern used by emergency vehicles, flashing the rear lights, alternating the illumination of the back-up lights and the rear tail lights, or other illuminating pattern. Also, activation of the horn may include modulating the intensity of the horn according to a wail pattern, a hi-lo pattern, a siren pattern, or other attention creating pattern.

In step 212, the vehicle or a controller in the vehicle checks if the counter is greater than zero. If the counter is zero or less then branch to end the process at step 226. If the counter is great than zero, the vehicle or a controller in the vehicle proceeds to step 214. In step 214 the vehicle or a controller in the vehicle sends a re-transition request to a module in the vehicle. The re-transmission request may be at a same frequency as the original message transmission, or the re-transmission may be at a different frequency than the original message transmission. For example, the re-transmission may be at the same frequency to provide the message to multiple other vehicles in proximity to the vehicle, or the re-transmission may be at a different frequency so that the re-transmission notifies other systems of the alarm activation. An example may include a vehicle to infrastructure message that provides an alert to proper authorities such as fire personnel, emergency medical personnel, or local police.

In step 216 the vehicle or controller delays a predetermined period of time and then deactivates the alarm in step 218 followed by ending the process in step 226.

In step 220 the vehicle or controller receives a propagation request. The propagation request may include personal identification information of the original message as presented in step 202 and may include identifying information of the vehicle that relays the message. The identifying information of the vehicle that relays the message may include the VIN, license plate, state of registration, or other identifying information. The vehicle or vehicle controller may verify the personal information.

In step 222, the vehicle or a controller in the vehicle checks the message with a list of previous messages along with a time associated with the message and previous messages. If the time between reception of the message and previous messages is less than a predetermined amount, the message may be flagged as a duplicate message and the system will then branch to end the process at step 226. If the message does not match any previous messages, the flow proceeds to step 224. In step 224, the vehicle or a controller in the vehicle decreases the value of the counter embedded in the message and proceed to step 208 as described above.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   a horn;
   a plurality of exterior lights; and
   at least one controller configured to grant vehicle system access to a nomadic device paired to the vehicle, and in response to receiving a message that contains data identifying a source of the message while the vehicle is in a key-off state from a nomadic device not paired to the vehicle, activate the horn and exterior lights according to respective patterns,
   wherein the message includes biometric data, physiological data, motion data, temperature data, or activation technique data.

2. The vehicle of claim 1, wherein the message includes a driver license number, a state of the driver license number, a name and date of birth associated with the driver license number, a VIN number, a mobile phone number, a national ID number, or a social security number.

3. The vehicle of claim 1, wherein the controller is further configured to retransmit the message.

4. The vehicle of claim 1, wherein the controller is further configured to connect to a remote server to validate the message.

5. The vehicle of claim 1, wherein the controller is further configured to validate the message by matching fields of the message with a verification database.

6. The vehicle of claim 1, wherein the message includes a location of the nomadic device not paired to the vehicle.

7. The vehicle of claim 6, wherein the at least one controller is further configured to activate the horn and exterior lights based on a distance between the vehicle and nomadic device not paired to the vehicle.

8. The vehicle of claim 1, wherein the at least one controller is further configured to communicate with the nomadic device not paired to the vehicle using a radio frequency band of one megahertz or greater.

9. The vehicle of claim 1, wherein the nomadic device not paired to the vehicle is a mobile phone, an electronic wrist band, or an electronic wrist watch.

10. A method for a vehicle comprising:
    receiving by a transceiver a message from a remote wireless device not paired to the vehicle; and activating, by a controller configured to grant vehicle system access to a remote wireless device paired to the vehicle, a vehicle horn or vehicle exterior lights in response to the message containing data identifying a source of the message, wherein the message includes biometric data, physiological data, motion data, temperature data, or activation method data.

11. The method of claim 10, wherein the message includes a driver license number, a state of the driver license number, a name and date of birth associated with the driver license number, a VIN number, a mobile phone number, a national ID number, or a social security number.

12. The method of claim 10 further comprising transmitting by the transceiver the message in response to a counter being less than zero.

13. The method of claim 12 further comprising connecting to a remote server and validating the message.

14. The method of claim 13, wherein validating the message includes matching fields of the message with a verification database.

15. A system of a vehicle comprising:

at least one controller configured to grant vehicle system access to a paired nomadic device, and in response to receiving a message containing data identifying a source of the message from a non-paired nomadic device while the vehicle is in a key-off state, activate a horn of the vehicle or lights of the vehicle, wherein the at least one controller is further configured to re-transmit the message.

16. The system of claim 15, wherein the at least one controller is further configured to activate the horn or lights based on a distance between the vehicle and non-paired nomadic device.

17. The system of claim 15, wherein the at least one controller is further configured to validate the message.

* * * * *